June 23, 1959  A. S. VOLPIN  2,891,566

AUTOMATIC LUBRICATED PLUG VALVE

Filed Dec. 24, 1956

INVENTOR.
ALEXANDER S. VOLPIN
BY
Russell E. Schloff

United States Patent Office 2,891,566
Patented June 23, 1959

2,891,566

AUTOMATIC LUBRICATED PLUG VALVE

Alexander Samuel Volpin, Miami Beach, Fla.

Application December 24, 1956, Serial No. 630,316

1 Claim. (Cl. 137—246.12)

This invention relates to an automatically lubricated plug valve wherein line pressure from the upstream side forces sealing material from a reservoir around the downstream body port to provide a seal therefor.

While automatically lubricated valves are quite old as exemplified by my United States Patent 2,269,886 dated January 13, 1942, in many instances the various valves require extensive and intricate machining of the coacting sealing surfaces, making successful application of the automatic line pressure sealing system principle difficult to apply to inexpensive valves. However, in the present invention, there is a single reservoir cavity formed in the base of the plug to accommodate the sealing material. So forming the reservoir eliminates expensive body handling and drilling required to provide a reservoir in the body, and should permit the extension of the automatic line pressure sealing principle to less expensive valves.

Even though there is only a single reservoir cavity, the cavity is divided by a movable barrier into two separate chambers, with passages extending from the respective ends of the reservoir to distribution grooves disposed about opposite sides of the plug, thereby permitting either side of the valve to be the high pressure side.

The sealing material is introduced into chamber on the downstream side of the movable barrier. The sealing material forces the movable barrier to the opposite end of the chamber, exhausting any entrapped line pressure into the upstream port, thereby utilizing virtually the entire reservoir area for the storage of the sealing material. The storage of a considerable quantity of lubricant is thereby accommodated and the frequency of refilling the reservoir is substantially reduced.

When the valve is in the closed position, line pressure from the upstream side enters into the upstream chamber of the reservoir and pressure is thereby applied to the movable barrier, thus feeding sealing material into the distribution grooves about the downstream body port.

It is one of the objects of the present invention to provide an inexpensive means for applying the principle of automatic line pressure lubricant sealing to plug valves.

Another object of the present invention is to provide an automatic line pressure lubricant sealed plug valve having a large lubricant reservoir in the base of the plug.

A further object of the invention is to provide a two-way automatic line pressure lubricant sealed plug valve having a single reservoir cavity in the base of the plug.

A still further object is to provide an automatic lubricant plug valve having an open reservoir in the plug in which the body cooperates with the plug to close the reservoir under constant resilient pressure.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 1:
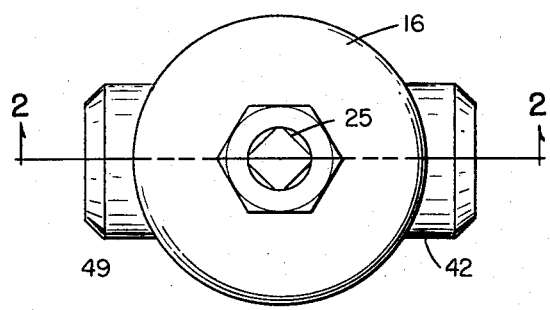
Figure 1 is a top plan view of the valve of the present invention.
Figure 2:
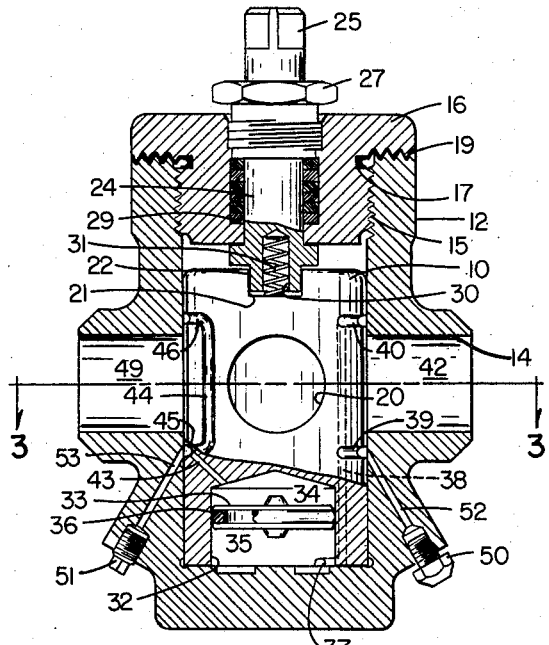
Figure 2 is a vertical section showing parts of the plug in elevation and illustrating the general arrangement of the structure, taken generally on line 2—2 of Figure 1.
Figure 3:
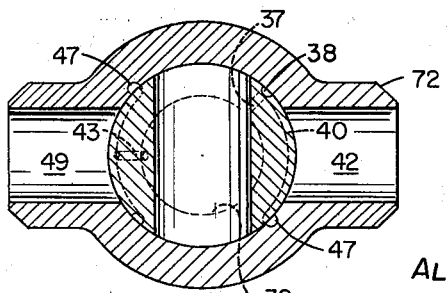
Figure 3 is a section view taken generally on the line 3—3 of Figure 2.

The invention is shown as applied to a plug valve having a cylindrical plug 10 therein, but it is obviously applicable to other shapes of plug valves. The plug 10 fits snugly in a cylindrical plug chamber 11 within a valve body 12 and transversely of a fluid passage 14. The valve body 12 is arranged to be connected to a flow system in any desired manner as is well known in the art.

The upper portion of the plug chamber 11 is threaded at 15 to receive a cap or bonnet 16 which may be sealed to the body with a lip type packing 17 and the irregular gasket 19 so as to insure a seal with the body, as is shown in my previous Patent 2,591,031, dated April 1, 1952. However, if desired, other means of forming a bonnet seal may be utilized.

The plug 10 is provided with a flow port 20. The top of the plug is provided with a non-circular driving slot 21 to receive the end 22 of a stem 24. The upper end of the stem 24 extends beyond the cap 16 and has a non-circular portion 25 to receive a wrench or other member for turning the plug 10. The packing 26 and the retainer collar 27 are disposed in a large recess 29 in the cap so as to provide a seal about the stem. The bottom of the stem 24 is provided with a hole 30 to receive a plug hold down spring 31. The spring 31 acts to hold the plug 10 downward under a constant resilient pressure as will be explained subsequently.

The base of the plug 10 is provided with a cavity which forms a reservoir 32 for sealing material. The reservoir being so located can be easily machined. Positioned in the reservoir is a movable barrier 33, which divides the reservoir cavity 32 into two separate chambers 34 and 35. The circumferential edge of the barrier 33 is provided with a seal ring 36 to prohibit leakage of sealing material from one side 34 of the barrier to the other side 35, and to prohibit contamination of the sealing material by the fluid flowing through the valve. Utilizing an O ring seal permits the construction of a thinner barrier 33, thus increasing the effective volume of the reservoir 32.

A groove 37 connects the chamber 35 of the reservoir with the distribution grooves 38, 39, 40 and 41 for sealing one side 42 of the valve and passageway 43 connects the top chamber 34 of the reservoir with distribution grooves 44, 45, 46 and 47 for sealing of the other side 49 of the valve. Lubricant fittings 50 and 51 permit introducing sealing material from the exterior of the valve into passageways 52 and 53 which lead into groove system and subsequently in the reservoir for initial filling and subsequent replenishing of the reservoir 32.

As an example, if side 42 of the valve is to be the upstream side, then sealing material is introduced through lubricant fitting 51 on the opposite side of valve which becomes the downstream side. The sealing material will fill the distribution groove system 44—47 and also flow through passage 43 into the reservoir filling chamber 34 of the reservoir. The incoming lubricant forces the barrier 33 downward in chamber 35 exhausting into the upstream port any entrapped line fluid, thereby permitting all the reservoir capacity to be utilized for the storage of sealing material. If desired, the upstream lubricant fitting 50 may be capped to prevent filling the improper side of the reservoir.

In the foregoing example, with the valve closed, line pressure from the upstream side 42 will flow through groove system 38—41 and through passage 37 into the lower chamber 35 of the reservoir. The line fluid flowing into the lower chamber 35 of the reservoir will exert pressure on the barrier 33 and consequently exert pressure on the sealing material in the upper chamber 34, thereby forcing the sealing material from the upper chamber 34 into the groove system 44—49. The sealing material in the groove system 44—49 will encompass the downstream port and thereby automatically seal the downstream side 49 of the valve. If side 49 is the upstream side, a like situation will be established with side 42 of the valve now being downstream. The groove system is so arranged that when the valve is open the groove ssytem will not be connected to the reservoir and, therefore, lubricant will not be needlessly wasted.

Inexpensive lubricated plug valves, both tapered and cylindrical, having an operable stem formed integrally with the plug and means to introduce sealing material through an axial bore in the stem with provision to distribute sealing material to the face of the plug and the body frequently have the difficulty of misalignment. The misalignment results since the sealing material by being forced by positive displacement through use of a screw member in the stem, eventually tends to move the plug out of alignment with the port. In the present design, the spring 31 acts upon the plug with a constant resilient pressure to maintain it in axial alignment, inasmuch as the hydraulic end forces on the plug are in balance there will be no tendency for the plug to move into misalignment with the port. Also having the constant resilient pressure, permits a sealing contact between the bottom of the plug and the body to close the chamber 35 of the reservoir, except for the connection 37 to the groove system. Therefore, when the valve is in the line, pressure is equal on all sides and the spring maintains pressure tight fit which is maintained during operation and no other closure is necessary for the chamber 35 of the reservoir.

As various changes may be made in the form, construction and arrangement of parts herein without departing from the spirit and scope of the invention and without sacrificing any of its advantages, it is to be understood that all matter herein should be interpreted as illustrative and not in a limited sense.

I claim:

An automatic line pressure lubricant sealed plug valve including a housing, an open ended cylindrical plug chamber therein, opposed flow ports on each side of said chamber, a rotatable ported one piece cylindrical plug in said chamber adapted to move into and out of registry with said flow ports, an independent lubrication distribution system for each of said ports, a central bore in one end of said plug forming an open ended lubricant reservoir, said end positioned against the bottom of the plug chamber, a sliding piston dividing said reservoir into separate chambers, a passage from one independent distribution system connected to one of said chambers and a passage from the other independent distribution system connecting the other chamber whereby pressure from the upstream side of said valve will flow into the reservoir and exert pressure on the piston to force lubricant into the distribution system on the downstream side, a cap closing the open end of said plug chamber, a stem passing through the cap, a spring cooperating with the stem and the other end of said plug constantly exerting pressure on the plug to keep the open ended reservoir against the bottom of the plug chamber.

References Cited in the file of this patent

UNITED STATES PATENTS

| Re. 20,093 | Neuhaus | Sept. 1, 1936 |
| 1,942,031 | Le Duc | Jan. 2, 1934 |
| 2,360,599 | Volpin | Oct. 17, 1944 |
| 2,368,183 | Volpin | Jan. 30, 1945 |
| 2,568,935 | Smith | Sept. 25, 1951 |
| 2,584,761 | Volpin | Feb. 5, 1952 |
| 2,591,031 | Volpin | Apr. 1, 1952 |

FOREIGN PATENTS

| 494,261 | Germany | Mar. 20, 1930 |